US007488699B2

(12) United States Patent
Huang et al.

(10) Patent No.: US 7,488,699 B2
(45) Date of Patent: Feb. 10, 2009

(54) HOLLOW MESOPOROUS CARBON ELECTRODE-CATALYST FOR DIRECT METHANOL FUEL CELL AND PREPARATION THEREOF

(75) Inventors: Chun-Chieh Huang, Hsinchu (TW); Man-Yin Lo, Hsinchu (TW); Hong-Pin Lin, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 321 days.

(21) Appl. No.: 11/311,486

(22) Filed: Dec. 20, 2005

(65) Prior Publication Data

US 2006/0166811 A1 Jul. 27, 2006

(30) Foreign Application Priority Data

Dec. 30, 2004 (TW) .............................. 93141540 A

(51) Int. Cl.
*B01J 21/18* (2006.01)
*B01J 23/00* (2006.01)
*B01J 23/40* (2006.01)
*C01B 31/00* (2006.01)
*C01B 31/02* (2006.01)
*C09D 13/00* (2006.01)

(52) U.S. Cl. .................. 502/182; 502/185; 423/445 R; 423/461; 106/31.26

(58) Field of Classification Search ................. 502/182, 502/185; 423/445 R, 461; 106/31.26
See application file for complete search history.

(56) References Cited

U.S. PATENT DOCUMENTS

| 6,812,187 | B1 * | 11/2004 | Pak et al. | ..................... 502/180 |
| 7,153,806 | B2 * | 12/2006 | Srinivas et al. | .............. 502/150 |
| 7,220,697 | B2 * | 5/2007 | Pak et al. | ..................... 502/185 |
| 2002/0187896 | A1 * | 12/2002 | Ryoo et al. | ................. 502/418 |

OTHER PUBLICATIONS

"Meso-cellular silica foams, macro-cellular silica foams and mesoporous solids: a study of emulsion-mediated synthesis," T. Sen et al. Microporous and Mesoporous Materials 78 (2005), pp. 255-263.*
"Key issues in the preparation of DMFC electrocatalysts," Man-Yin Lo et al. International Journal of Hydrogen Energy 32 (2007), pp. 731-735.*

* cited by examiner

*Primary Examiner*—J. A. Lorengo
*Assistant Examiner*—Patricia L Hailey
(74) *Attorney, Agent, or Firm*—Bacon & Thomas PLLC

(57) ABSTRACT

The present invention discloses a novel electrode-catalyst for direct methanol fuel cell prepared by introducing a carbon precursor into pores of a wormhole-like molecular sieve template, carbonizing the carbon precursor, removing the molecular sieve template to obtain a wormhole-like mesoporous carbon having a high specific surface of 800-1000 $m^2/g$ and a pore size of 4-5 nm, and depositing catalyst metal such as Pt—Ru on the mesoporous carbon.

9 Claims, 2 Drawing Sheets

HOLLOW MESOPOROUS CARBON ELECTRODE-CATALYST FOR DIRECT METHANOL FUEL CELL AND PREPARATION THEREOF

FIELD OF THE INVENTION

The present invention relates to a direct methanol fuel cell, and particularly to an electrode-catalyst for a direct methanol fuel cell.

BACKGROUND OF THE INVENTION

At present, electrode-catalysts for a direct methanol fuel cell used by a commercial company or a R/D center mostly use a carbon black from the Cabot Company (Vulcan XC-72, with a surface area of about 250 $m^2/g$) as a carrier. Vulcan XC-72 is an electrically conductive material, which has been used for over 30 years. The potential defects of Vulcan XC-72 include a low surface area, and liable to cause an excessive particle size of the activation center and a relatively low loading ratio for an electrode-catalyst requiring a high loading. For example, the average particle size of the activation center of a Pt/Carbon catalyst having 10 wt % Pt deposited on a carbon black carrier Vulcan XC-72 with a surface area of about 250 $m^2/g$ is 2.0 nm; the values are 3.2 and 8.8 nm, separately, when the content of the Pt ingredient is increased to 30 wt % and 60 wt %, respectively. This finding indicates that an increase on the metal loading of a catalyst does not necessarily increase the surface area of the catalyst's activation center. In order to increase the metal loading and maintain a small particle size, studies must be emphasized on increasing the surface area of the carrier and improving the synthesis method of the carrier. One of the methods in making a breakthrough on the current direct methanol fuel cell is to develop a new carbon material with a higher surface area, a more uniform porosity distribution, and a higher electrical conductivity.

In 1992 researchers at Mobil Corp. (U.S. Pat. No. 5,108,725) disclosed a new family of crystalline mesoporous materials, M41S. These mesoporous molecular sieves with adjustable and uniformed pore sizes in the range of 1.5 to 10.0 nm cover a new range of potential applications. One member of this series, MCM-41, possessing a hexagonal arrangement of uniformly sized channel mesopores, has been the focus of most recent applications as catalysts and sorbents. The disclosure in U.S. Pat. No. 5,108,725 is incorporated herein by reference. Heretofore, mesoporous molecular sieves synthesized include M41S series, and SBA series, etc., the pore (channel) sizes range from 1.5 to 30 nm.

A direct methanol fuel cell generates power by converting the chemical energy in methanol into electric energy and involves gas-liquid-solid three phase reactions. Other than increasing the surface area of a catalyst's activation center, the catalyst's activity is also affected by the mass transfer rate of methanol and the capability in discharging the carbon dioxide generated by the reactions. Therefore, the pore size, sterical structure and surface properties (surface functional groups, hydro-affinity, etc.) of a carbon carrier have a significant influence on the performance of a cell. Thus, research on the carbon material is one of the key factors in increasing the performance of a fuel cell.

SUMMARY OF THE INVENTION

The present invention discloses a novel electrode-catalyst for direct methanol fuel cell, wherein a molecular sieve template technique is used to synthesize a novel mesoporous carbon material having an increased specific surface area of carbon carrier, an increased pore size, and a shell-type 3-D structure. When a catalyst metal is deposited on said carbon material, the efficiency of the catalyst metal is increased, the production cost of the electrode-catalyst is reduced, and the activity of the electrode-catalyst is increased.

Presently, the specific surface area of a mesoporous carbon material is about 1600 $m^2/g$, which is about 6~7 times of the specific surface area of carbon black. However, such a mesoporous carbon material has a pore distribution of 2~3 nm and has excessively long pore channels. This situation is disadvantageous for methanol in entering the pores and reacting with the activation center of the catalyst metal in the pores, and is also disadvantageous for the discharge of the carbon dioxide formed during the reaction. This results in a useless activation center of the catalyst metal in the pores, an electrode-catalyst with a low activity, and a high production cost.

The present invention provides a hollow mesoporous carbon electrode-catalyst, which comprises a hollow mesoporous carbon material and a catalyst metal deposited on said hollow mesoporous carbon material, wherein said hollow mesoporous carbon material has a specific surface area of 800~1500 $m^2/g$, a pore size distribution of 4~20 nm; and wherein said catalyst metal is selected from a group consisting of Cr, Mo, W, Mn, Tc, Re, Fe, Ru, Os, Co, Rh, Ir, Ni, Pd, Pt, Cu, Ag, Au, Zn, Sn, Al, and a mixture thereof.

Preferably, said catalyst metal comprises Pt, Ru, or a mixture thereof.

Preferably, the electrode-catalyst of the present invention comprises 15-85 wt % of said catalyst metal, based on the weight of said mesoporous carbon material.

Preferably, said hollow mesoporous carbon material is in the shell form.

The present invention also discloses a method for preparing a hollow mesoporous carbon electrode-catalyst, which comprises the following steps:

a) preparing a micro emulsion, which comprises mixing water, a water-insoluble oil, and a surfactant, wherein the volume of said oil is less than the volume of said water;

b) preparing a molecular sieve template for synthesizing a hollow mesoporous carbon material, which comprises preparing an acidic aqueous solution containing a silicon oxide and an alkali metal source dissolved therein, mixing said micro emulsion with said acidic aqueous solution, heating the resulting mixture at 50° C. to 200° C. for a sufficient period of time to form a molecular sieve, and calcining said molecular sieve to obtain a surfactant-free molecular sieve template;

c) introducing a carbon precursor into said molecular sieve template, which comprises impregnating said molecular sieve template with a carbon precursor solution;

d) heating said molecular sieve template impregnated with said carbon precursor in an inert atmosphere to carbonize said carbon precursor contained therein;

e) removing said molecular sieve template to obtain a hollow mesoporous carbon material; and f) depositing a catalyst metal on said hollow mesoporous carbon material.

Preferably, the surfactant in Step a) is a non-ionic surfactant.

Preferably, the silicon oxide and alkali metal source in Step b) is sodium silicate.

Preferably, said carbon precursor solution in Step c) comprises a solvent and a resin dissolved in said solvent. More preferably said resin comprises a phenolic resin.

Preferably said step of removing said molecular sieve template in Step e) comprises using an acid solution to wash said carbonized carbon precursor and molecular sieve template.

Preferably, said step of depositing a catalyst metal on said hollow mesoporous carbon material in Step f) comprises impregnating said hollow mesoporous carbon material in a solution containing ions of said catalyst metal; and subjecting the impregnated hollow mesoporous carbon material to a reduce treatment, so that said catalyst metal ions are deposited on said hollow mesoporous carbon material in the elemental form.

Preferably, the catalyst metal in Step f) is selected from a group consisting of Cr, Mo, W, Mn, Tc, Re, Fe, Ru, Os, Co, Rh, Ir, Ni, Pd, Pt, Cu, Ag, Au, Zn, Sn, Al, and a mixture thereof. More preferably, said catalyst metal comprises Pt, Ru, or a mixture thereof.

The present invention increases the pore size of the carbon carrier. In one of the preferred embodiments according to the present invention, the pore size of a carbon carrier is increased from 2-3 nm for a conventional mesoporous carbon material to 4.8 nm. Meanwhile, the structure of the carbon carrier is altered from a solid carbon particle to a hollow mesoporous carbon material. Thus, the activation centers of catalyst metal are substantially distributed on the shell portion of said carbon carrier, thereby obtaining a shell-type electrode-catalyst advantageous in discharging the carbon dioxide generated. After the properties of the carbon material have been improved, the activity of an electrode-catalyst has increased from 61 mA/g-PtRu using a conventional mesoporous carbon material to 174 mA/g-PtRu—an increase of 285%.

DETAILED DESCRIPTION OF THE INVENTION

Figure 1:
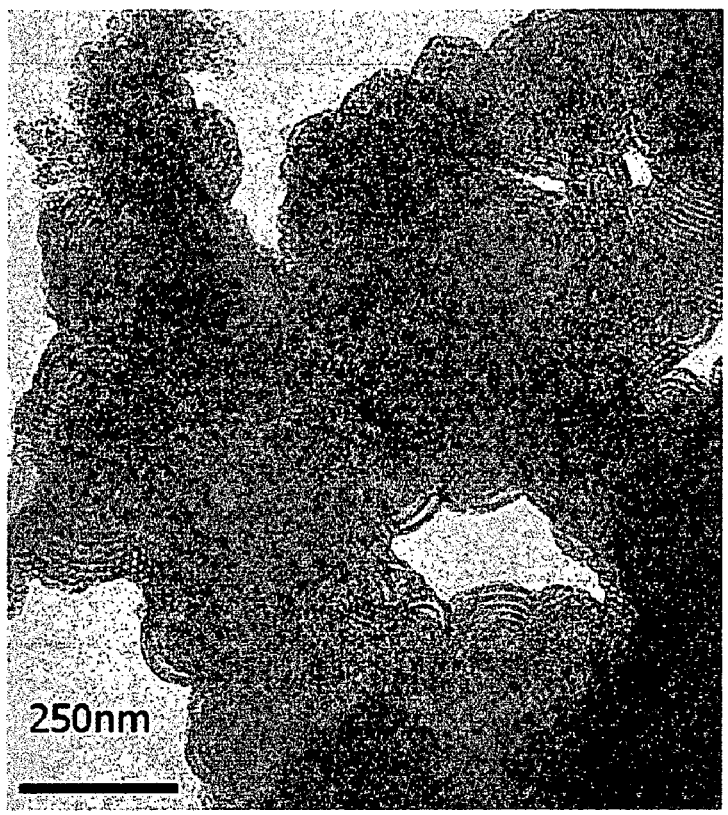
FIGS. 1 and 2 separately show the transmission electron microscopy (TEM) photos of a hollow mesoporous carbon material (MCB-1) prepared according to Example 1 of the present invention.

According to one of the preferred embodiments of the present invention, the synthesis of a hollow meso-Pt—Ru electrode-catalyst includes the following three major steps: firstly preparing a wormhole-like molecular sieve as a template, detailed in the following Step (1); next, filling a carbon precursor, phenolic resin, into the template, carbonizing the resin at a high temperature, and removing the template, detailed in the following Step (2); and using an impregnation process to deposit Pt—Ru on the surface of said hollow mesoporous carbon material obtain a Pt—Ru/mesoporous carbon electrode-catalyst, detailed in the following in Step (3):

(1) Method for Synthesizing a Silica Template:

A non-ionic surfactant is dissolved in water and mixed homogenously at room temperature. Toluene is added into the solution, and the resulting mixture is agitated in a thermostat to form micro emulsion, wherein 100 g of water is added with about 2.0~16.0 g of toluene, and 2~3 g of a non-ionic surfactant.

An acidic sodium silicate solution is added to the micro emulsion.

The product is filtered, washed with water, and dried to obtain a surfactant-containing vesicular-like meso-porous material.

Said surfactant-containing vesicular-like meso-porous material is calcined to obtain a silica template material free of surfactant.

(2) Synthesis of Carbon Material:

A phenolic resin is dissolved in ethanol. The resulting solution is mixed homogenously and poured into said calcined meso-porous material. The resulting mixture is agitated at room temperature for 24 hours, wherein the mixing ratio of said phenolic resin to ethanol (weight ratio) is 1:0.5~8.0:50.

The resulting mixture is transferred to an oven to be hardened at 100° C.

The hardened mixture is ground to powder and mounted in a quartz tube and graphitized in a high temperature furnace.

HF is used to wash off the molecular sieve template portion in order to obtain a hollow mesoporous carbon material.

(3) Synthesis of Catalyst:

Said hollow mesoporous carbon material is added with a suitable amount of a solution containing Pt and Ru ions, and the resulting mixture is placed still over night.

The resulting mixture is dried by heating under vacuum in order to obtain a catalyst precursor of Pt—Ru/mesoporous carbon material.

Hydrogen is introduced to reduce said precursor into a Pt—Ru/mesoporous carbon electrode-catalyst.

EXAMPLE 1

A hollow mesoporous carbon material was prepared by the following steps: (a) synthesizing a micro emulsion; (b) synthesizing a wormhole-like molecular sieve template; (c) introducing a carbon precursor into said molecular sieve template; (d) carbonizing said carbon precursor/molecular sieve template at a high temperature; (e) removing the molecular sieve template to obtain a hollow mesoporous carbon material; and (f) synthesizing a Pt—Ru/hollow mesoporous carbon catalyst.

(a) 1.4 g of a non-ionic polymer surfactant P123 ($EO_{20}PO_{70}EO_{20}$, wherein EO and PO separately represent ethylene oxide and propylene oxide) was dissolved in 50.0 g of water. The resulting solution was mixed homogenously at room temperature, then added with 1-8 g of toluene, and then stirred in a thermostat (30° C. or 40° C.) overnight to form a micro emulsion.

(b) 5.5 g of sodium silicate was dissolved in 300.0 g of water at 40° C. The solution was agitated in a thermostat for about 3 minutes. The resulting solution was added with HCl aqueous solution to be adjusted to a pH value of about 5.0, and then added with said micro emulsion. The resulting mixture was allowed to undergo reaction in a thermostat (30° C. or 40° C.) for 10 minutes. The reaction mixture was introduced into a polypropylene (PP) bottle for further reaction in a 100° C. hot water bath for a day. Next, the resulting product mixture was filtered, washed by water, and dried, to obtain a surfactant-containing vesicular-like meso-porous material. Said surfactant-containing vesicular-like meso-porous material was calcined at 560° C. for 6~8 hours in order to obtain a surfactant-free silica template.

(c) 0.5-6 g of a resol-type phenolic resin (PF650, from the Chang Chun Plastics Co. Ltd., Taiwan, Mw~96,000) was dissolved in 10-50 g of ethanol. The solution was stirred homogenously and then introduced into said calcined meso-porous material (1 g). The resulting mixture was stirred at room temperature for 24 hours, and then transferred to an oven at 100° C. to be hardened for 24~48 hours. Next, the hardened mixture was ground to powder.

(d) Said hardened powder from Step (c) was loaded in a quartz tube and graphitized in a high temperature furnace in nitrogen at 900° C. for 1.5 hours.

(e) The molecular sieve template portion was washed off by 4.8% HF aqueous solution, wherein the ratio of (molecular sieve): $HF_{(aq)}$=1:100 (weight ratio), thereby obtaining a hollow meso-porous carbon material (code MCB-1).

(f) 1.1 g of said hollow meso-porous carbon material was heated in vacuum, and then mixed with a $Ru(NO_3)_3$ aqueous solution (50 g/L, 12 ml) (containing 0.6 g of Ru) and a $Pt(NO_2)_2(NH_3)_2$ aqueous solution (15 g/kg, 20 g) (containing 0.3 g of Pt). The mixture was placed still overnight, and then heated at 90° C. in vacuum for completely drying the Pt—Ru/mesoporous carbon catalyst precursor. Said Pt—Ru/mesoporous carbon catalyst precursor was placed in a catalyst reduction device into which 2% hydrogen was introduced at 200° C., sot that it was reduced to form a Pt—Ru/mesoporous carbon electrode-catalyst (code 45% Pt—Ru/MCB-1).

Figure 2:
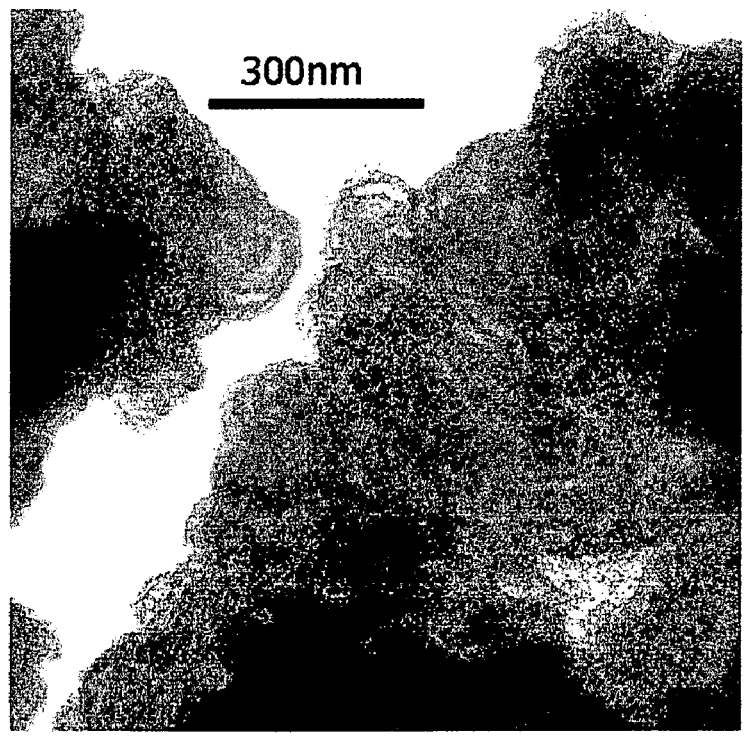

FIGS. 1 and 2 separately show the transmission electron microscopy (TEM) photos of a hollow mesoporous carbon material (MCB-1) prepared according to Example 1 of the present invention, wherein a shell-type 3-D structure is shown in the photos.

Figure 3:
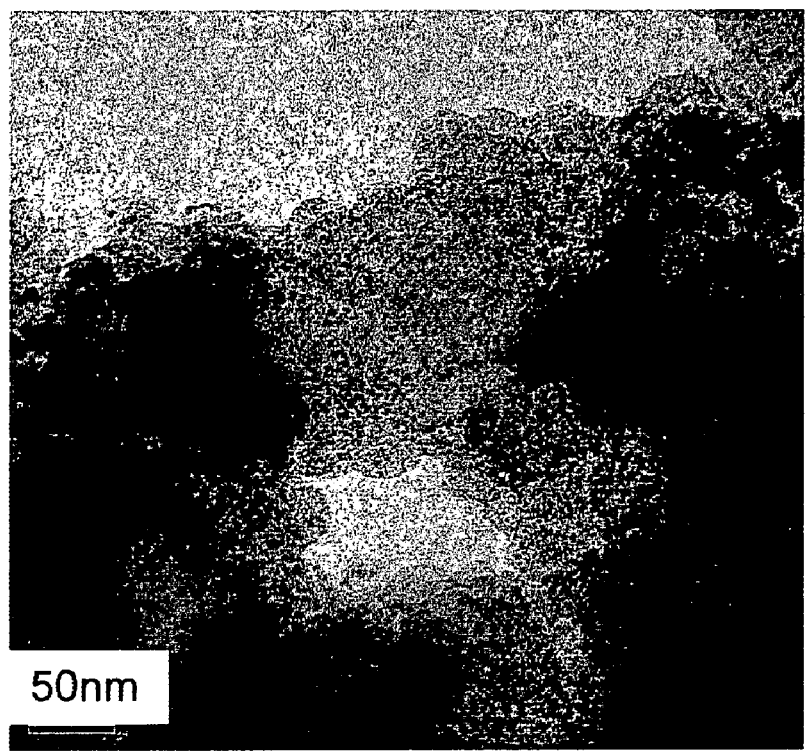
FIGS. 3 and 4 separately show the TEM photos of a Pt—Ru/mesoporous carbon electrode-catalyst prepared according to Example 1 of the present invention.
Figure 4:
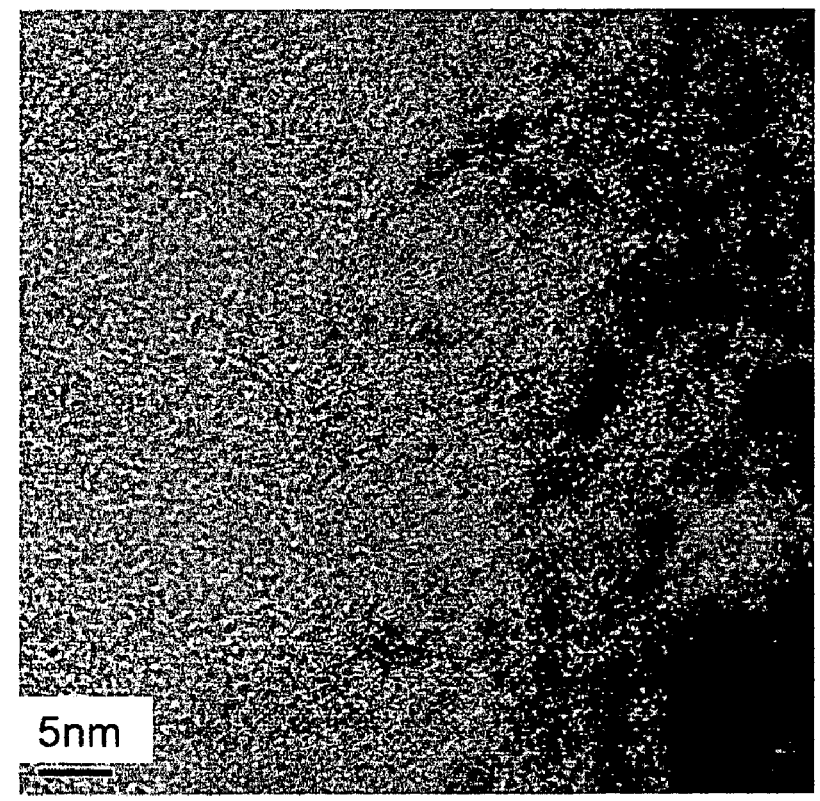

FIGS. 3 and 4 separately show the TEM photos of a Pt—Ru/mesoporous carbon electrode-catalyst prepared according to Example 1 of the present invention, wherein nano particles of Pt—Ru are distributed on the surface of the hollow mesoporous carbon material.

Controls 1 and 2:

A commercial catalyst (60% PtRu/C, from the E-TEK Co.) widely used industrially was directly used in Control, and a mesoporous carbon material (CMK-3, prepared according to a method disclosed in J. Am. Chem. Soc. 2000, 122, 10712-10713) was used to prepare an electrode-catalyst (code: 45% Pt—Ru/CMK-3) having 45% Pt—Ru loading, based on the weight of the carrier, by repeating Step (f) in Example 1.

Table 1 shows the properties of the carriers of the electrode-catalysts of Example 1, and Controls 1 and 2, and the current densities of the direct methanol fuel cells using said electrode-catalysts.

TABLE 1

|  | Composition | Current Density (mA/mg) | Specific surface area of carrier ($m^2$/g) | Pore size of carrier (Å) |
| --- | --- | --- | --- | --- |
| Control 1 | 60% PtRu/C | 112 | 250 | 110 |
| Control 2 | 45% PtRu/CMK-3 | 61 | 1,064 | 38 |
| Example 1 | 45% PtRu/MCB-1 | 174 | 873 | 48 |

The specific surface area and the pore size of the carriers in Table 1 were measured by a BET method.

The invention claimed is:

1. A method for preparing a hollow mesoporous carbon electrode-catalyst, which comprises the following steps:
   a) preparing a micro emulsion, which comprises mixing water, a water-insoluble oil, and a surfactant, wherein the volume of said oil is less than the volume of said water;
   b) preparing a molecular sieve template for synthesizing a hollow mesoporous carbon material, which comprises preparing an acidic aqueous solution containing a silicon oxide and an alkali metal source dissolved therein, mixing said micro emulsion with said acidic aqueous solution, heating the resulting mixture at 50° C. to 200° C. for a sufficient period of time to form a molecular sieve, and calcining said molecular sieve to obtain a surfactant-free molecular sieve template;
   c) introducing a carbon precursor into said molecular sieve template, which comprises impregnating said molecular sieve template with a carbon precursor solution;
   d) heating said molecular sieve template impregnated with said carbon precursor in an inert atmosphere to carbonize said carbon precursor contained therein;
   e) removing said molecular sieve template to obtain a hollow mesoporous carbon material; and
   f) depositing a catalyst metal on said hollow mesoporous carbon material.

2. The method as claimed in claim 1, wherein the surfactant in Step a) is a non-ionic surfactant.

3. The method as claimed in claim 1, wherein the silicon oxide and alkali metal source in Step b) is sodium silicate.

4. The method as claimed in claim 1, wherein said carbon precursor solution in Step c) comprises a solvent and a resin dissolved in said solvent.

5. The method as claimed in claim 4, wherein said resin comprises a phenolic resin.

6. The method as claimed in claim 1, wherein said step of removing said molecular sieve template in Step e) comprises using an acid solution to wash said carbonized carbon precursor and molecular sieve template.

7. The method as claimed in claim 1, wherein said step of depositing a catalyst metal on said hollow mesoporous carbon material in Step f) comprises impregnating said hollow mesoporous carbon material in a solution containing ions of said catalyst metal; and subjecting the impregnated hollow mesoporous carbon material to a reduce treatment, so that said catalyst metal ions are deposited on said hollow mesoporous carbon material in the elemental form.

8. The method as claimed in claim 1, wherein the catalyst metal in Step f) is selected from a group consisting of Cr, Mo, W, Mn, Tc, Re, Fe, Ru, Os, Co, Rh, Ir, Ni, Pd, Pt, Cu, Ag, Au, Zn, Sn, Al, and a mixture thereof.

9. The method as claimed in claim 8, wherein said catalyst metal comprises Pt, Ru, or a mixture thereof.

* * * * *